(12) United States Patent
Davis

(10) Patent No.: US 9,089,120 B2
(45) Date of Patent: Jul. 28, 2015

(54) FISHING LURE LINE CONNECTOR

(75) Inventor: James Ronald Davis, Rock Hill, SC (US)

(73) Assignee: Davis Fishing Technologies, Inc., Edisto Island, SC (US)

(*) Notice: Subject to any disclaimer, the term of this patent is extended or adjusted under 35 U.S.C. 154(b) by 616 days.

(21) Appl. No.: 13/403,276

(22) Filed: Feb. 23, 2012

(65) Prior Publication Data

US 2013/0219770 A1  Aug. 29, 2013

(51) Int. Cl.
*A01K 85/00* (2006.01)
*A01K 91/04* (2006.01)

(52) U.S. Cl.
CPC ...................... *A01K 91/04* (2013.01)

(58) Field of Classification Search
USPC ........... 43/42.08, 44.83, 44.92; 24/601.8, 908
See application file for complete search history.

(56) References Cited

U.S. PATENT DOCUMENTS

| | | | |
|---|---|---|---|
| 159,403 A * | 2/1875 | Foster | 24/598.6 |
| 872,934 A * | 12/1907 | Harig | 43/42.74 |
| 2,216,487 A | 10/1940 | Domagala | |
| 2,227,420 A | 1/1941 | Augenblick | |
| 2,564,260 A | 8/1951 | Houser | |
| 2,594,620 A | 4/1952 | Braithwaite | |
| 2,840,898 A | 7/1958 | Yeo | |
| 2,844,449 A * | 7/1958 | Alpert et al. | 44/387 |
| 3,241,201 A * | 3/1966 | Chester | 24/343 |
| 3,740,803 A | 6/1973 | Arteburn | |
| 3,913,185 A * | 10/1975 | James | 24/697.1 |
| 3,974,587 A * | 8/1976 | Levake et al. | 43/42.19 |
| 4,819,305 A * | 4/1989 | Ooe | 24/598.6 |
| 5,042,191 A | 8/1991 | Fett | |
| 5,603,181 A | 2/1997 | Abdul-Raheem | |
| 5,655,329 A * | 8/1997 | Yong-Set | 43/44.92 |
| 5,901,495 A * | 5/1999 | Leigeber | 43/44.92 |
| 6,840,001 B1 | 1/2005 | Cox | |
| 6,959,470 B2 * | 11/2005 | Kuslich et al. | 24/129 R |

* cited by examiner

*Primary Examiner* — Christopher P Ellis
(74) *Attorney, Agent, or Firm* — Timothy D. St. Clair; Nexsen Pruet, LLC

(57) ABSTRACT

A fishing lure line connector is provided with an undivided, single width, unitary elongated member shaped to form first and second eyelets at its respective ends and a circinate hoop, the first and second eyelets axially aligned and residing outboard of the circinate hoop. A method of attaching a fishing lure line connector to a fishing lure having a connection feature is also provided, comprising providing a fishing lure line connector having a hoop and first and second axially aligned line apertures connected to and disposed outboard of the hoop, and moving the connection feature between the first and second line apertures to within the hoop.

16 Claims, 7 Drawing Sheets

FISHING LURE LINE CONNECTOR

TECHNICAL FIELD

The present invention relates generally to a connector for attaching a fishing line to a fishing lure and, more particularly, to a fishing lure line connector configured to allow in-water lure retrieval upon a undivided, single width, unitary connector.

BACKGROUND

Great efforts have been devoted to fishing lure design. Various objectives and advantages have been pursued, for example to provide particular lure movement or lure component movement, to advantageously reflect attractive light, to impart sound to the surrounding water, to travel in appealing paths during retrieval, and the like.

Similarly, much attention has been focused upon the engineering of fishing line. Different materials have been developed, as have different sizes, strengths, flexibilities, and colors.

Unfortunately, not enough ingenuity has been trained upon the connection by which such fishing lures are connected to such fishing lines. A typical device for connecting a lure to a fishing line has been a snap or a swivel snap. Both are notorious for coming undone during use, thereby losing lures and losing hooked fish. Moreover, the geometric configurations of snap and swivel snap connectors, such as those aspects that allow such connectors to be removed from lures, either require bulkier structures to provide adequate strength or sacrifice strength if greater lure action is sought by use of more delicate structures. Furthermore, both snaps and swivel snaps are difficult and time consuming to install in lures, particularly in lures that require such connectors to be threaded through two holes. For example, with blade baits and with bladed swim jigs, fishing line is connected to the blade member rather than to another connection feature of the lure. A blade bait contains a blade, weight attached to the blade, and a hook attached to the blade and a bladed swim jig carries a blade upon a weighted hook; with both, the action of the blade is engineered to attract fish. Snaps and swivel snaps are very difficult to attach to blade baits and to bladed swim jigs.

Another, alternative connector has been the split ring. However, the split ring's configuration leaves it even more difficult and time consuming to install than a snap or a swivel snap, especially to a lure in which the connector must be passed through two holes in the blade. Furthermore, with split rings, the lure is retrieved on two overlapped rings, which limits the action of the lure. Additionally, under sufficient load during lure retrieval, one ring of a split ring may slip relative to the other, which may cause inconsistent lure action. Moreover, with round split rings, either the line or the connection feature of the lure can get stuck in the split between the rings, also causing inconsistent lure action, or the lure connection feature can shift back and forth across the terminal ends of the split ring, likewise causing inconsistent lure action.

Traditional fishing lure line connectors are designed to allow removal of the lure from the connector without cutting the fishing line. Such functionality has advantages in some circumstances. However, provision of that functionality requires configurations that must trade between less restraint in lure action and greater strength—enhancing one diminishes the other. Provision of that functionality may, therefore, compromise the primary purpose of fishing lures: unfettered lure performance in catching fish. Connector mechanisms that allow release of the lure from the connector weaken the connector, requiring bulkier structural dimensions to counteract such weakness, but bulkier structural dimensions hamper lure performance, such as by constricting lure action. Such mechanisms also provide more opportunity for failure during use. Moreover, modern fishing techniques, particularly those used in competitive fishing, presuppose that the line will be quickly cut when lure replacement is desired, rather than manipulation of a release contrivance to remove the lure, predominant priority being placed on lure performance in catching fish instead of on avoiding cutting the fishing line.

Traditional fishing lure line connectors also have failed to conceive that the connection by which a lure is attached to a fishing line can affect the aerodynamic efficiency of the lure during flight through the air as it cast and thus have also failed to discover that the fishing lure line connector might be configured so as to minimize the aerodynamic drag of the cast lure.

What is needed is a fishing lure line connector that overcomes the foregoing shortcomings. The connector should be relatively easy to install quickly in a lure. It should allow unimpeded movement of the lure as the lure is retrieved through water. The connector's design should be intrinsically strong, allowing minimized dimensions for the connector. And, ideally, the connector should allow for aerodynamically streamlined flight of the lure during casting.

SUMMARY OF THE INVENTION

In response to the limitations and problems encountered in the art, a new fishing lure line connector has been discovered. As revealed in the following description and the appended figures, this invention discovers an optimized yet simplified connector that smartly accomplishes numerous advantages in attachment of a fishing lure to a fishing line. Its configuration allows for easy and quick assembly to a lure, even to a lure with which the connector must be laced (for example during lure manufacture) through two holes in a lure blade. Its design is inherently strong, allowing the use of relatively thinner structures and minimized dimensions. The connector's unitary nature is inconsistent with unintentional release; it cannot be undone. The design, including its shape and its relatively thinner structures, also allows full movement of the lure during retrieval through water, unconstrained by the connector, even with blade baits and bladed swim jigs. The present invention also discovers a fishing lure line connector that allows a fishing lure to assume an aerodynamically efficient pose while traveling through air during casting, allowing longer and more accurate casting of the lure.

In accordance with certain aspects of certain embodiments of the present technology, a fishing lure line connector is provided comprising an elongated member and first and second eyelets. The elongated member may be shaped to form the first and second eyelets at its respective ends and to form a circinate hoop. The first and second eyelets may be axially aligned and may reside outboard of the circinate hoop. In particular configurations, the first and second eyelets may reside side-by-side. In certain examples, a first stem may extend from the circinate hoop to the first eyelet and a second stem may extend from the circinate hoop to the second eyelet. Optionally, the first and second stems may be parallel. In some instances, the hoop may define a center and the first and second stems may extend radially from the center.

In accordance with additional aspects of other embodiments of the present technology, a fishing lure line connector is provided that may comprise a circular hoop and first and second stems projecting from the circular hoop. The first and second stems may terminate at first and second line apertures, respectively, the first and second line apertures being coaxial. The hoop, first and second stems, and first and second line apertures may be unitary. Specific examples of the present invention may include the first and second stems residing side-by-side. In particular embodiments, the circular hoop may define a uniform maximum thickness and, in certain configurations, the circular hoop and the first and second stems may define a uniform maximum thickness. In some representations, the connector may define a maximum thickness about the hoop and the hoop may define a minimum inner diameter, and the minimum inner diameter may be at least triple the maximum thickness about the hoop. In certain illustrations, the first and second line apertures may define first and second outer maximum widths, respectively, neither such outer width being greater than five times the maximum thickness defined about the hoop. In some examples, the minimum inner diameter defined by the hoop may be at least six times the maximum thickness defined by the circular hoop.

In accordance with yet additional aspects of other embodiments of the present invention, a method is provided for attaching a fishing lure line connector to a fishing lure that has a connection feature. Different lures have different types of connection features: some have eyelets, wire loops, rings, or the like; others have a single hole in a portion of the lure; still others, such as blade baits and bladed swim jigs, have two adjacent holes in a blade; other types of mechanisms are provided with other lures; as used herein, the term "connection feature" refers to any aspect of a lure for attachment of fishing line. The invented method comprises the steps of providing a fishing lure connector that comprises a hoop with first and second line apertures connected to and disposed outboard of the hoop, and moving the lure connection feature between the first and second line apertures to within the hoop. Particular practices of the method may further comprise a fishing lure line connector that includes first and second line apertures that each define an interior profile that is curvilinear opposite the hoop. The fishing lure line connector in certain embodiments may further comprise first and second stems interposed between the hoop and the first and second line apertures, respectively. Some examples of this technology may provide first and second stems extending radially from the hoop. In individual illustrations, the first and second stems may be parallel. In some examples of this technology, the fishing lure blade may define therethrough first and second connector holes, with the step of moving the lure connection feature between the first and second line apertures to within the hoop further including respectively moving the first line aperture through the first connector hole and moving the second line aperture through the second connector hole. In specific embodiments, the first and second connector holes may define first and second minimum widths, respectively, and the connector may define a maximum thickness about the hoop, the first and second minimum widths each being at least quadruple the maximum thickness defined by the connector about the hoop. In some forms, the hoop may define a minimum diameter that is at least triple the maximum thickness defined about the hoop.

The foregoing description broadly sets forth certain features of the present invention so that the detailed description hereinbelow may be better understood and so that the present contributions from this invention to the art may be better appreciated. Additional features of the invention will be described hereinbelow and the appended figures.

The purpose of the Abstract hereinabove is only to enable the United States Patent and Trademark Office and the public generally to determine the nature and gist of the technical disclosure from a cursory inspection. The Abstract is not provided for interpreting the scope of the claims herein, nor to define the invention or the application, nor to be limiting in any way as to the scope of the invention.

Additional objects and advantages of the present subject matter are set forth in, or will be apparent to those of ordinary skill in the art from, the detailed description herein. Modifications and variations to the features and elements hereof may be practiced in various embodiments and uses of the invention without departing from the spirit and scope of the subject matter. Variations may include, but are not limited to, substitution of equivalent means, features, or steps for those referenced, or the functional, operational, or positional reversal of various parts, features, steps, or the like. Still further, it is to be understood that different embodiments of the present subject matter may include various combinations or configurations of features, steps, or elements, or their equivalents (including combinations of features, parts, steps, or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise disclosed in this application. Those of ordinary skill in the art will better appreciate the features and aspects of such embodiments, and others, upon review of the remainder of the specification.

BRIEF DESCRIPTION OF THE DRAWINGS

The details of the present invention, both as to its structure and as to its functionality, can be understood with reference to the accompany figures, which are not to scale in all instances.

DETAILED DESCRIPTION

Figure 1:
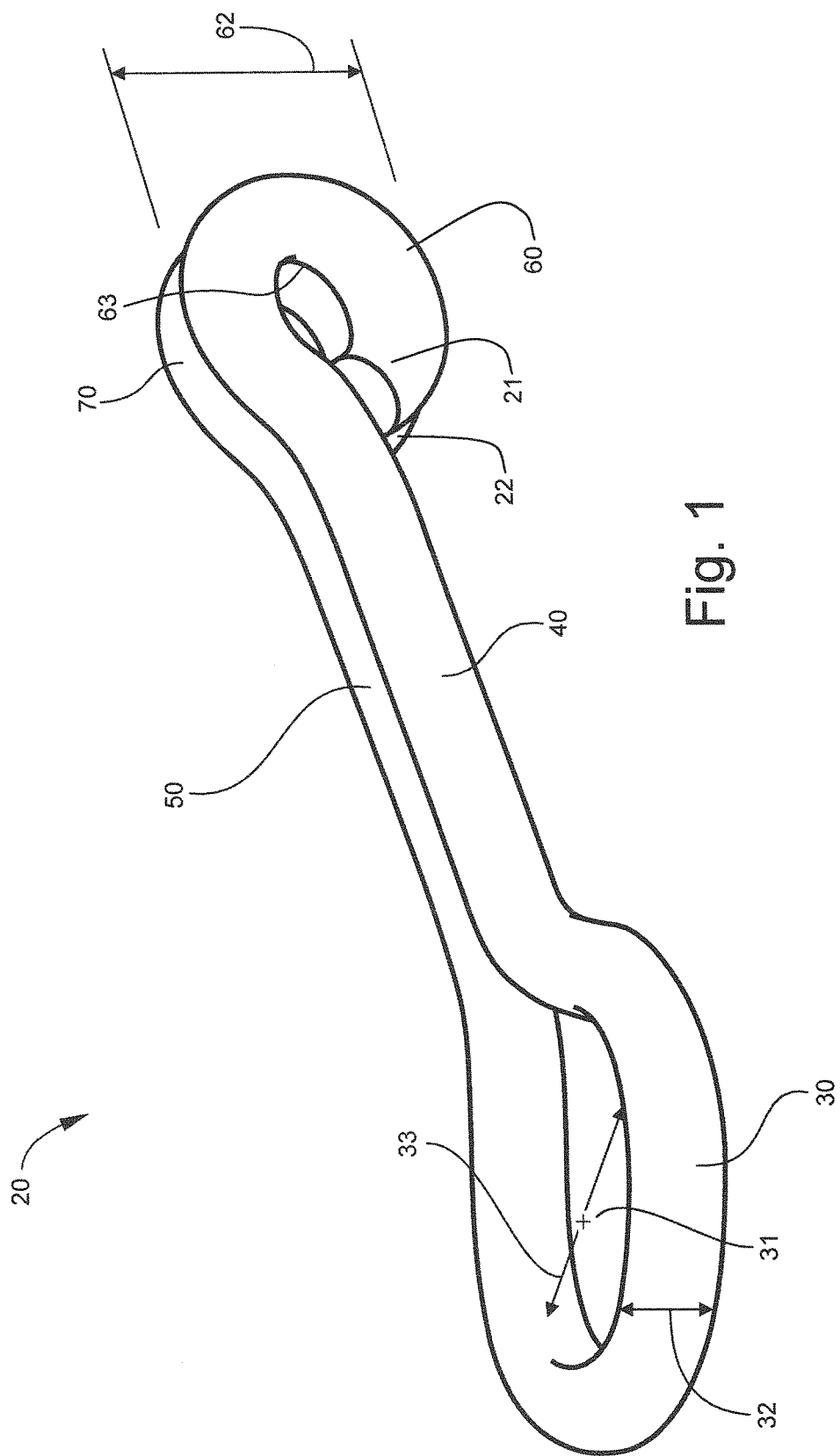
FIG. 1 is a perspective view of a fishing lure line connector in accordance with certain aspects of the present invention.

Reference will now be made in detail to the presently preferred embodiments of the invention, one or more examples of which are illustrated in the figures. Each example is provided by way of explanation of the invention and not meant to be a limitation of the invention. For example, features illustrated or described as part of one embodiment may be used with a different embodiment to yield yet still another embodiment. It is intended that the present application include such modifications and variations as come within the scope and spirit of the invention. Selected combinations or aspects of the disclosed technology correspond to a plurality of different embodiments of the present invention. Certain features may be interchanged with similar devices or different features not expressly mentioned that perform the same or similar functions.

As used herein, the singular forms of "a," "and," and "the" include plural referents unless the context clearly dictates otherwise.

A fishing lure line connector, generally 20, is provided. Connector 20 may be fabricated of spring steel, stainless steel, brass, plastic, or other material of sufficient tensile strength.

Connector 20 may comprise an elongated member bent upon itself. Connector 20 may be shaped to form first and second eyelets 60, 70 at its respective ends. Additionally, connector 20 may be shaped to form a circinate hoop 30. Hoop 30 may define a center 31 within its circular shape. In some embodiments, hoop 30 may reside in a single plane. In particular configurations, connector 20 may define a first maximum thickness 32 about hoop 30. Additionally, hoop 30 may be understood to define a minimum inner diameter 33 within its circinate shape.

In certain embodiments, connector 20 may also comprise a fishing lure blade 80 carried by hoop 30. Blade 80 may define therethrough first and second connector holes 81, 83, hoop 30 circling through holes 81, 83. First and second connector holes 81, 83 may respectively define first and second minimum widths 82, 84. Widths 82, 84 need not be equal in all instances, nor alike, nor must holes 81, 83 be the same in all instances.

Also included with connector 20 are first and second eyelets 60, 70. Eyelets 60, 70 need not be of the same configuration nor of the same dimensions on any particular connector 20. Eyelets 60, 70 may provide line apertures for connection with fishing line 91. Eyelets 60, 70 may be axially aligned and/or coaxial, which may further facilitate threading through them a fishing line 91. In some embodiments, eyelets 60, 70 may be disposed and reside outboard of circinate hoop 30, although other locations may be configured.

Eyelets 60, 70 may respectively define first and second outer maximum widths 62, 72. In one exemplary embodiment, widths 62, 72 may be no greater than quintuple the maximum thickness 32 of hoop 30. To provide for installation of connector 20 through blade holes 82, 84, maximum widths 62, 72 may be no greater than first hole width 82 and second hole width 84, respectively. It may also be found that the dimensions of outside widths 62, 72, so minimized, increase the strength of eyelets 60, 70 in attaching fishing line 91 to a fishing lure 90, inasmuch as such reduced dimensions provide less leverage against connector 20 and thereby reduces the likelihood of failure of connector 20 at eyelets 60, 70. Eyelets 60, 70 may define distal profiles 63, 73 opposite hoop 30 that are curvilinear so as not to pinch or bind fishing line 91 within eyelets 60, 70.

In some embodiments, connector 20 may include first and second stems 40, 50. First and second stems 40, 50 may be interposed between hoop 30 and first eyelet 60, second eyelet 70, respectively, and terminate at first eyelet 60 and second eyelet 70, respectively. First and second stems 40, 50 may extend radially from hoop 30 and/or radially from center 31 of hoop 30. In some embodiments, first and second stems 40, 50 may reside side-by-side and, in still further embodiments, they may be parallel. Stems 40, 50 may be of any length advantageous to a particular application; in some instances, they may be of miniscule length and, as illustrated as an example in FIG. 5, in other instances they may be foregone altogether.

Three examples illustrate principles of the present technology. In the first example, a connector was created from an elongated wire member, the wire having a uniform diameter of about 0.032 inches. First eyelet 60 and second eyelet 70 were formed on the respective ends of the elongated wire member with outside widths 62, 72 of about 0.097 inches. Between eyelets 60, 70 a hoop 30 was formed with an inner diameter 33 of about 0.149 inches. With this particular example connector 20, stems 40, 50 were also included, having a length of about 0.3 inches.

As a second example, another connector 20 in accordance with the present invention was created together with a blade 80. In this example, connector 20 was created from an elongated wire member with a uniform diameter of about 0.024 inches. Eyelets 60, 70 were formed on the respective ends of the wire member having maximum outside widths 62, 72 of about 0.058 inches. A hoop 30 was created intermediate of eyelets 60, 70, the hoop 30 having an inner diameter of about 0.175 inches. In this particular, second example, stems 40, 50 were interposed between hoop 30 and eyelets 40, 50 respectively. The stems 40, 50 were about 0.26 inches in length. The blade 80 used in this example was for a bladed swim jig fishing lure, with two connector holes 81, 83. Connector holes 81, 83 had round hole widths 82, 84 of about 0.11 inches.

In the third example, two connectors 20 in accordance with the present technology were fabricated from 302 stainless steel wire with a circular cross-section, one using wire ¼ hard and the other using wire ½ hard, in both instances the wire having a uniform diameter of about 0.023 inches. As to each, eyelets 60, 70 were formed having outside diameters of about 0.095 inches. Additionally, a hoop 30 was created with a minimum inside diameter of about 0.154 inches. In this particular example, stems having lengths of about 0.200 inches were located on each connector 20 between eyelets 60, 70 and hoop 30.

The configurations of the connectors 20 in the preceding examples illustrate sample relative sizes of the inner diameter 33 of hoop 30 compared to the thickness 32 of hoop 30 as well as the maximum outside width 62, 72 of eyelets 60, 70, respectively, as compared to the thickness 32 of hoop 30. Furthermore, the second example also illustrates sample sizes of the connector holes 81, 83 relative to the thickness 32. Such relative sizes illustrate the cooperation of the aspects of connector 20, specifically hoop 30, eyelets 60, 70, connector hole widths 82, 84, and, if provided, stems 40, 50, to minimize the influence of connector 20 upon fishing lure performance and to allow the blades 80 of fishing lures to move unconstrained by connector 20. Of course, other relative sizes may also be configured, to the same objective. Additionally, the configuration of connector 20 with both first eyelet 60 and second eyelet 70 provides a stronger, doubled connection to a fishing line 91. Similarly, the provision of two stems 40, 50 multiply the strength of connector 20 in connecting a fishing line 91 to a blade 80. In some embodiments, the hoop 30, first and second stems 40, 50, and first and second eyelets 60, 70 may be one piece and/or integral.

Turning to the figures, FIG. 1 is a perspective view of one embodiment of a connector 20 in accordance with certain aspects of the present invention. As illustrated, a connector 20 includes hoop 30, first and second stems 40, 50, and first and second eyelets 60, 70. Hoop 30 may be understood to define a hoop center 31 and an inner diameter 33. Furthermore, hoop 30 may provide about itself a maximum thickness 32; in applications in which a uniform-diameter elongated member is used to form the entirety of a connector 30, maximum diameter 32 would equal the uniform diameter of such member.

In the embodiment depicted in FIG. 1, first eyelet 60 and second eyelet 70 have been shaped at the respective ends 21, 22 of the elongated member forming connector 20. Eyelet 60 is shown to define a first eyelet outside width 62.

So configured, connector 20 is inherently strong. Particularly in embodiments in which connector 20 is integral, unitary, and/or one piece, no components exist to break during use of connector 20 nor to allow connector 20 to come undone. Recognizing that failure of connector 20 in such instances would require failure of the material itself, the design of connector 20 for foreseeable loads during use allows for relatively smaller structures for hoop 30, first and second stems 40, 50, and eyelets 60, 70. Such relatively smaller structures enhance the ability of connector 20 to allow full performance of a fishing lure 90 attached with connector 20, unfettered by connector 20. Furthermore, it can be appreciated that connector 20 can be easily and quickly installed in a fishing lure, even a fishing lure requiring installation through two holes and a blade. As to the latter instance, stems 40, 50 can be urged apart, allowing eyelets 60, 70 to be inserted respectively through blade holes 81, 83. Once eyelets 60, 70 and, if included in the particular embodiment being used, stems 40, 50 are passed through blade holes 81, 83, the resiliency of connector 20 returns stems 40, 50, and therefore also eyelets 60, 70, to their original position, leaving connector 20 installed and ready for receipt of fishing line 91 through eyelets 60, 70.

Figure 4:
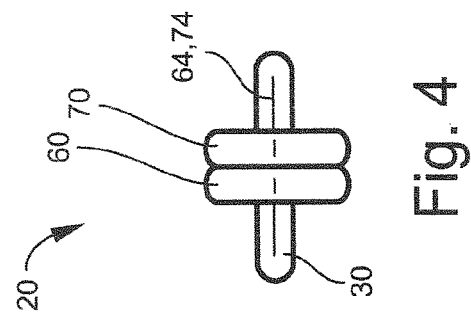
FIG. 4 is a side view of a fishing lure line connector in accordance with certain aspects of the present invention.
Figure 2:
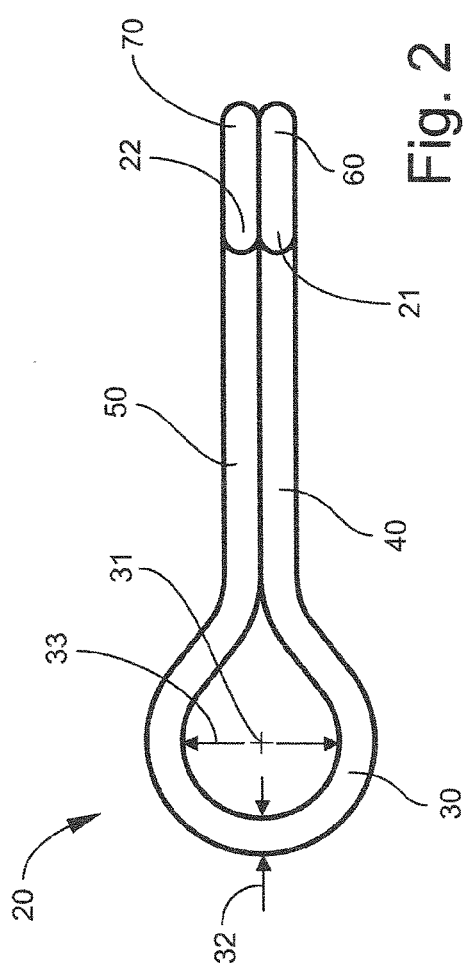
FIG. 2 is a top view of a fishing lure line connector in accordance with certain aspects of the present invention.
Figure 3:
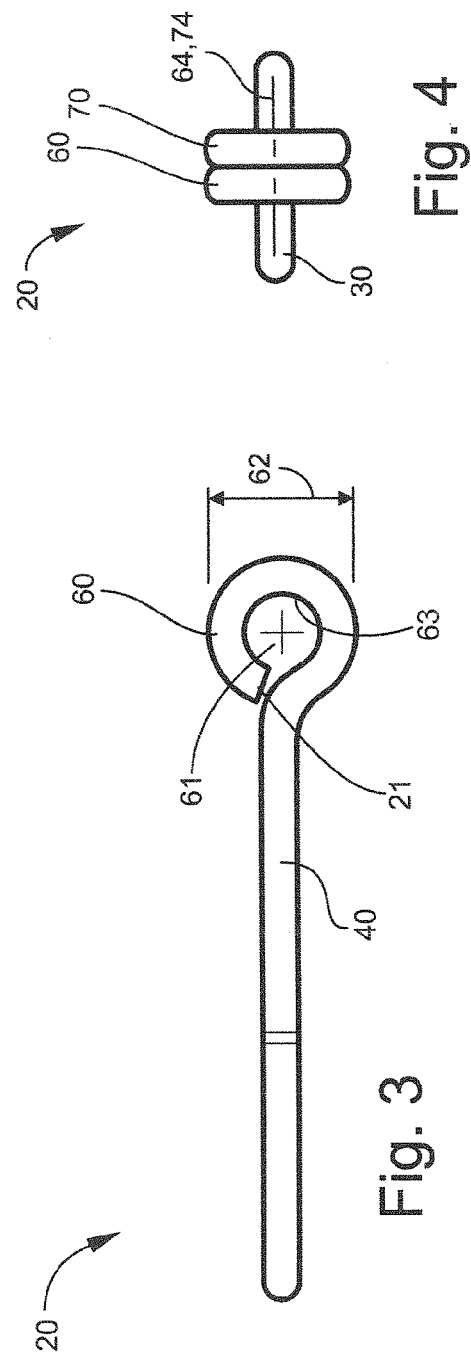
FIG. 3 is a front view of a fishing lure line connector in accordance with certain aspects of the present invention.

FIGS. 2, 3, and 4 are, respectively, top, front, and side views of a fishing lure line connector in accordance with certain aspects of the present invention. In addition to those features identified with respect to FIG. 1, FIG. 3 depicts first eyelet center 61. In the embodiment shown in FIG. 4, first eyelet center axis 64 and second eyelet center axis 74 are shown; in the particular embodiment depicted, first eyelets center axis 64 and second eyelet center axis 74 are co-linear, inasmuch as first eyelet 60 and second eyelet 70 have been axially aligned.

Figure 5:
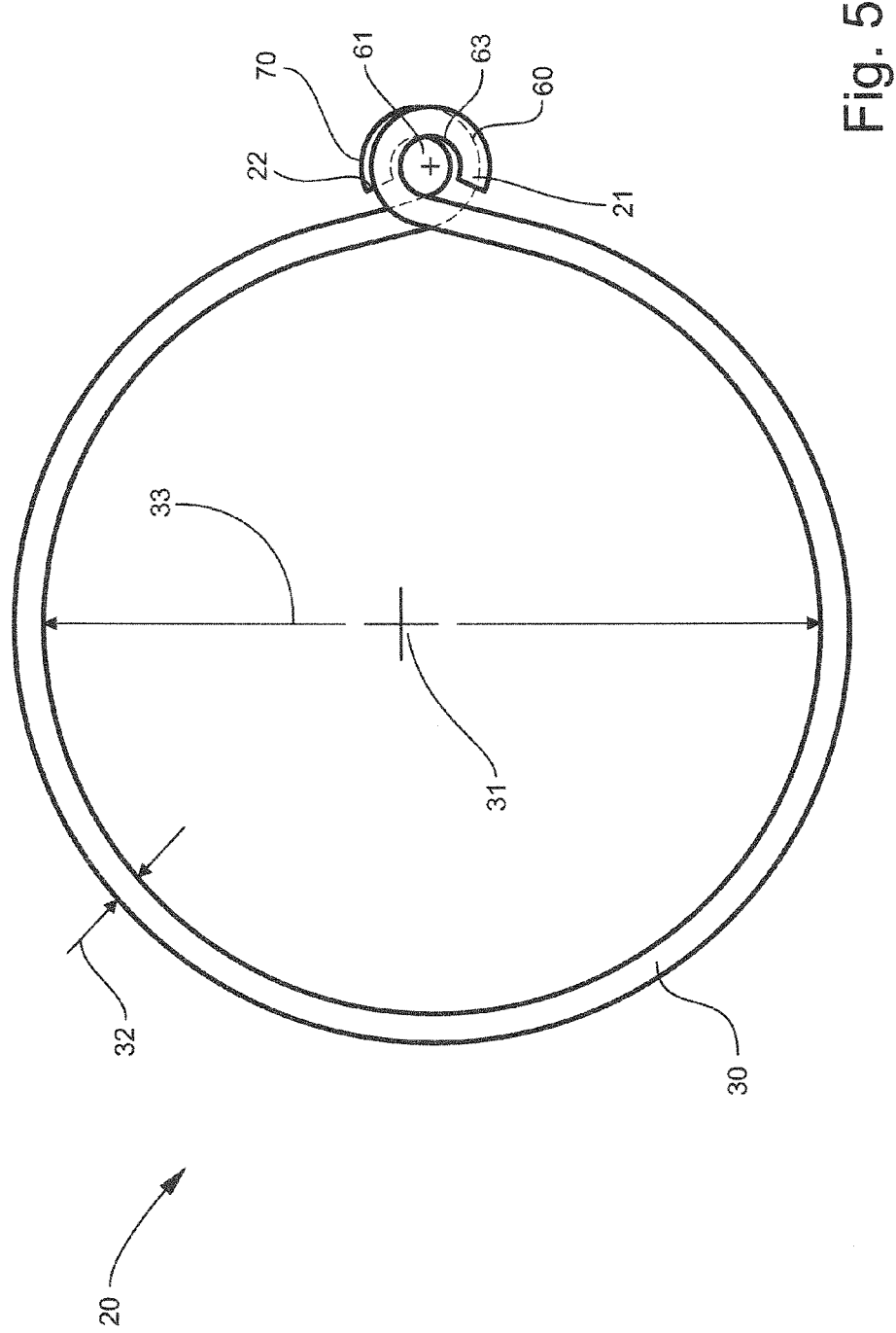
FIG. 5 is a front view of another embodiment of a fishing lure line connector in accordance with certain aspects of the present invention.

FIG. 5 is a front view of another embodiment of a fishing lure line connector 20 in accordance with certain aspects of the present invention. As depicted therein, connector 20 may be provided without stems 40, 50 interposed between hoop 30 and eyelet 60, 70, an embodiment of the present invention that may be desirable for some applications. Installation of a connector 20 of the configuration shown in FIG. 5 may be made as disclosed hereinabove. In the particular embodiment depicted in FIG. 5, first end 21 of connector 20 has been turned to form a first eyelet 60 of clockwise rotation, yet the other end 22 has been turned in a counterclockwise rotation to form second eyelet 70; such counter-rotated orientations of eyelets 60, 70 may provide additional line security and/or additional strength to connector 20 in some circumstances.

Figure 6:
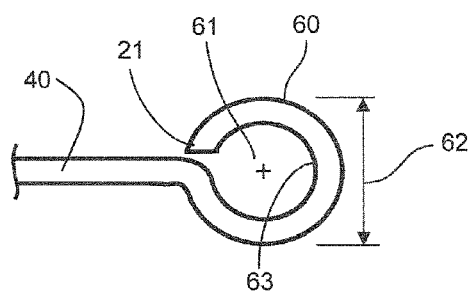
FIG. 6 is a partial front view of a line aperture of a fishing lure line connector in accordance with certain aspects of the present invention.
Figure 7:
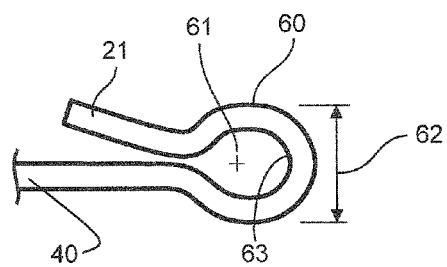
FIG. 7 is a partial front view of another embodiment of a line aperture of a fishing lure line connector in accordance with certain aspects of the present invention.
Figure 8:
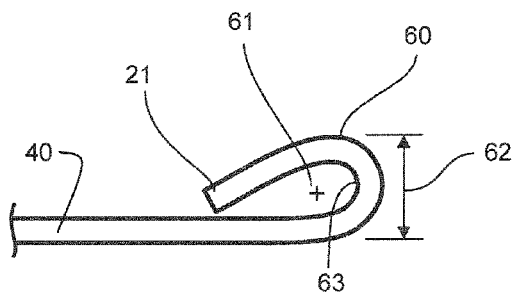
FIG. 8 is a partial front view of another embodiment of a line aperture of a fishing lure line connector in accordance with certain aspects of the present invention.
Figure 9:
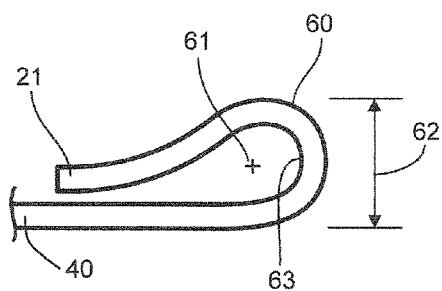
FIG. 9 is a partial front view of another embodiment of a line aperture of a fishing lure line connector in accordance with certain aspects of the present invention.
Figure 10:
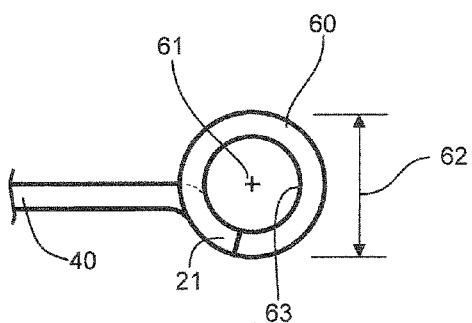
FIG. 10 is a partial front view of another embodiment of a line aperture of a fishing lure line connector in accordance with certain aspects of the present invention.

FIGS. 6, 7, 8, 9, and 10 depict alternative embodiments of an eyelet 60, but the same or similar embodiments may also be used with eyelet 70. FIGS. 6, 7, and 10 show embodiments in which the load of a retrieved lure, with or without a hooked fish, would be axially aligned with a stem 40; FIGS. 8 and 9 show alternative embodiments that may be advantageous in some circumstances, such as easier fabrication. The embodiment of FIG. 7 may provide for attachment of a fishing line 91 by slipping the line 91 beneath first end 21 toward eyelet center 61. In FIG. 10, first end 21 has been configured to overlap itself around eyelet 60. It will be noted that, though different in other respects, the embodiments of FIGS. 6 through 10 all share a common aspect: profile 63 distal to hoop 30 is curvilinear to not pinch or bind a fishing line 91 threaded within an eyelet 60.

Figure 11:
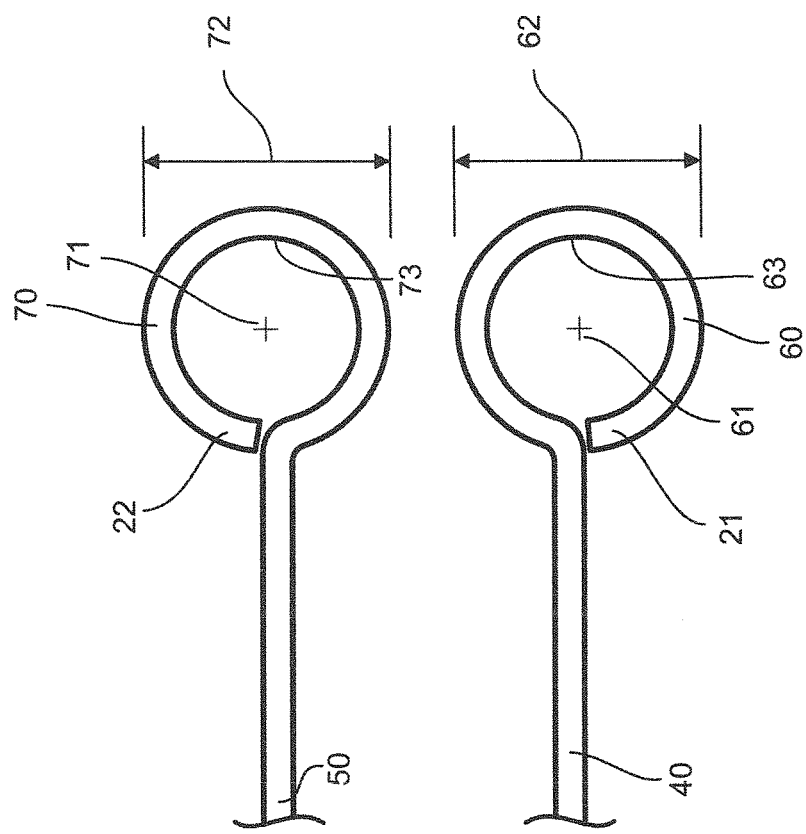
FIG. 11 is a partial front view of another embodiment of line apertures of a fishing lure line connector in accordance with certain aspects of the present invention.

FIG. 11 is an illustration of an alternative embodiment of eyelets 60, 70 first described hereinabove with reference to FIG. 5, that of counter-rotated eyelets 60, 70. The particular eyelets 60, 70 depicted in FIG. 11 are like those of FIG. 6, but embodiments like those depicted in FIGS. 7, 8, 9, and 10 may, likewise, be counter-rotated as may be desirable in certain circumstances.

In some embodiments of connector 20, first eyelet 60 may be of a particular configuration as depicted in one of FIGS. 6 through 10 but second eyelet 70 may be of a different configuration of another of the embodiments as depicted in FIGS. 6 through 10.

Figure 12:
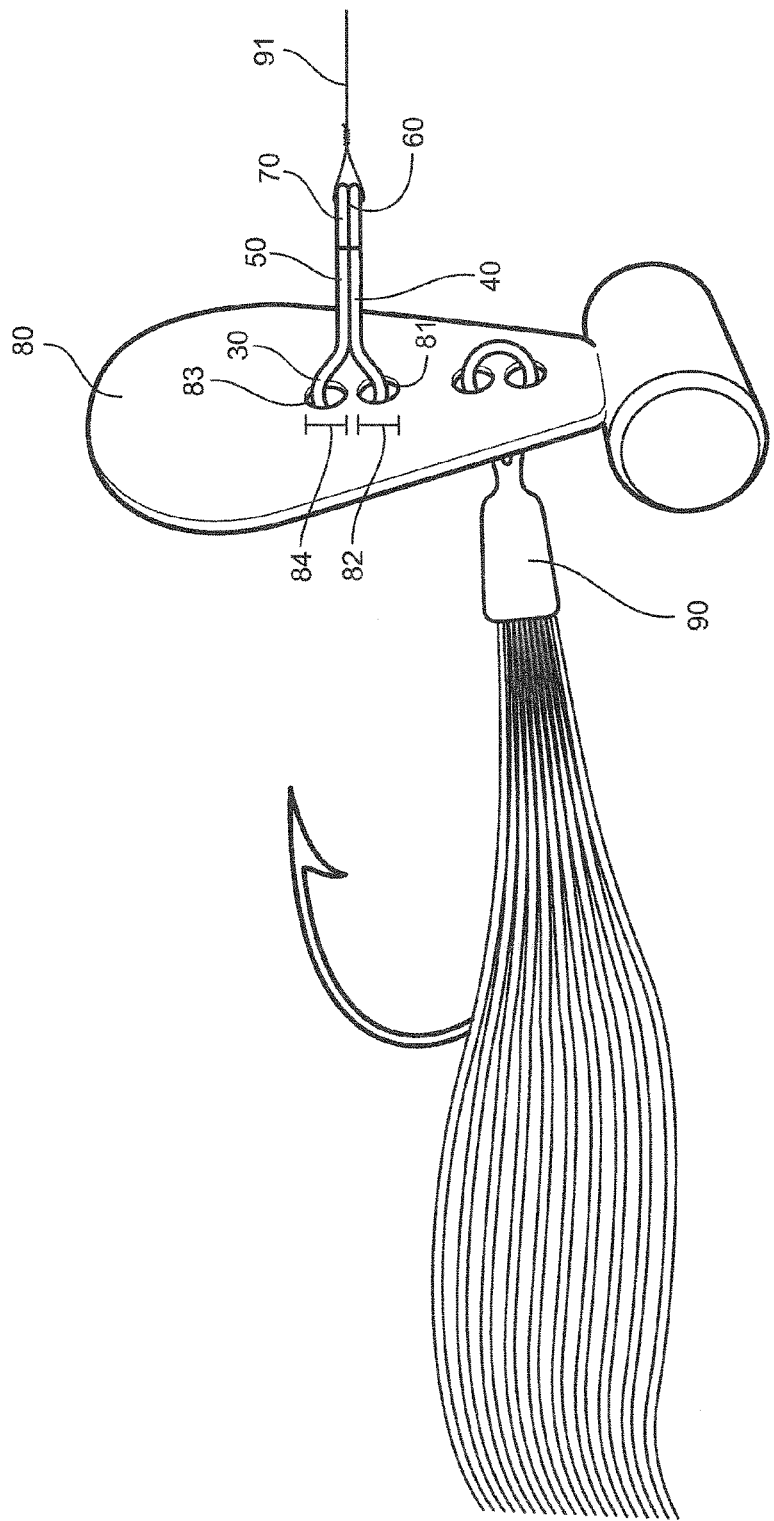
FIG. 12 is a perspective view of a fishing lure line connector in accordance with certain aspects of the present invention connecting a fishing line to a fishing lure.

FIG. 12 is a perspective view of a fishing lure line connector 20 in accordance with certain aspects of the present invention, connecting a fishing line 91 to a fishing lure 90 that includes a blade 80. Lure 90 is an illustration of a bladed swim jig. As depicted in FIG. 12, first connector hole 81 of blade 80 has a hole width 82, whereas second connector hole 83 of blade 80 has a hole width 84. So configured, connector 20 allows optimal blade movement of blade 80 relative to lure 90 and performance of blade 80 is unfettered and unimpeded by connector 20.

Figure 13:
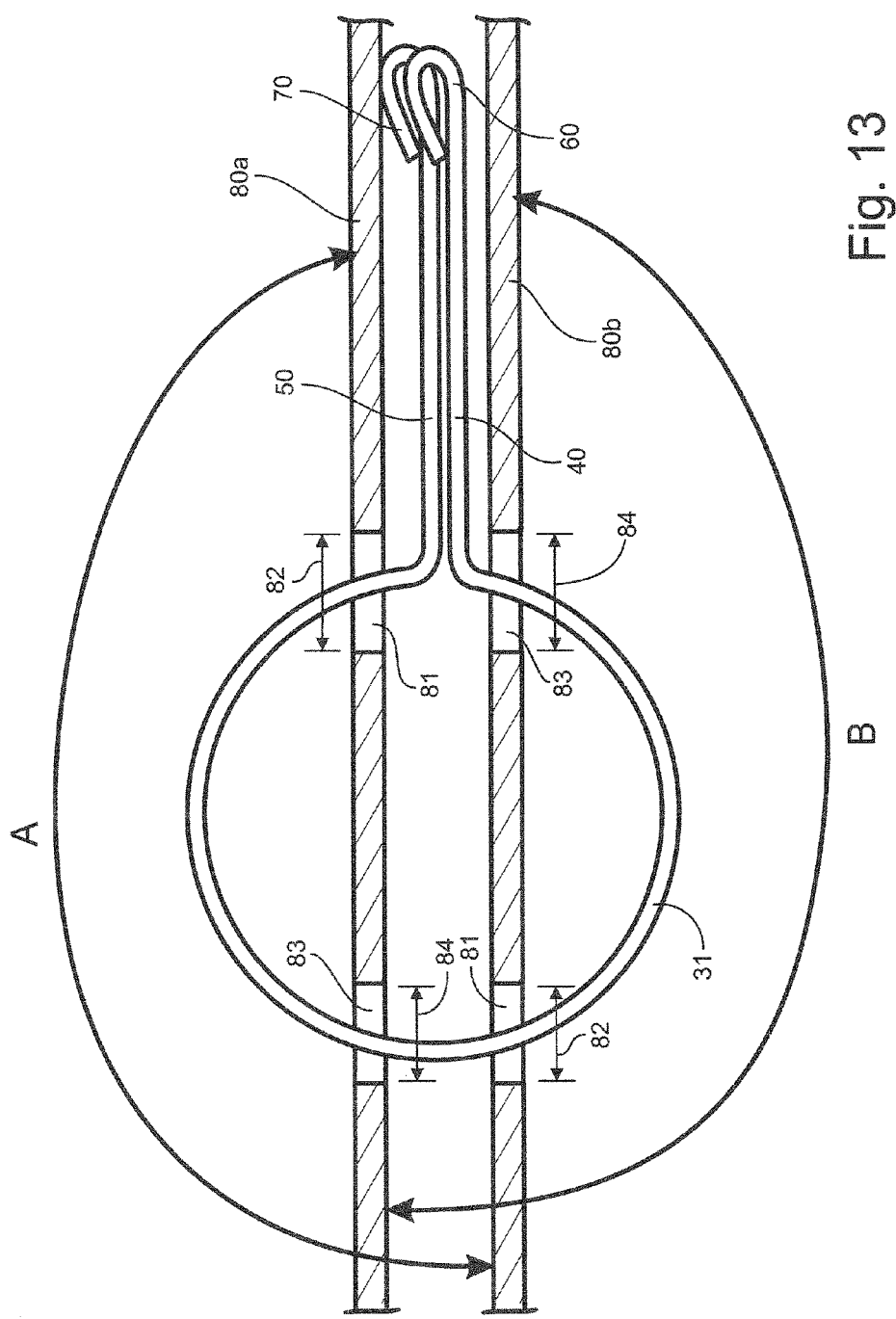
FIG. 13 is a partial section view of a fishing lure line connector and fishing lure blade in accordance with certain aspects of the present invention.

FIG. 13 depicts how connector 20 may function to minimize aerodynamic drag of a fishing lure during casting. FIG. 13 is a partial section view of a connector 20 and fishing lure blade 80, blade 80 shown in section upon a connector 20. As discovered by the present invention, the relative widths 82, 84 of blade holes 81, 83, the relative thickness 32 of hoop 30, the relative inner diameter 33 of hoop 30, the relative lengths of stems 40, 50, and the relative outside widths 62, 72 of eyelets 60, 70, respectively, cooperate together to allow blade 80 to swing at least about 180 degrees from position 80a to position 80b around the circinate shape of hoop 30 as illustrated by paths A, B. Even though hoop 30 may or may not define a completed circle, the relative sizes of the structures of connector 20, including stems 40, 50, outside widths 62, 72, and the thickness 32 and inner diameter 33 of hoop 30, relative to the widths 82, 84 of connector holes 81, 83, respectively, allow blade 80 to rotate relative to hoop 30, while not necessarily around a single center of rotation, nevertheless at least about 180 degrees as depicted by paths A, B. Accordingly, when a fishing lure 90 with a blade 80 is connected with a connector 20 and cast through the air, the latitude to rotate provided by connector 20 to blade 80, to such an extent, facilitates blade 80 assuming an aerodynamically efficient pose while travelling through air. It has been discovered, therefore, that use of a connector 20 in the fashion disclosed allows farther and more accurate casting of a lure 90.

The fishing lure line connector 20, so configured, provides an optimized yet simplified connector that elegantly accomplishes numerous advantages in attachment of a fishing lure 90 to a fishing line 91. Its eyelets 60, 70 and, in some embodiments, stems 40, 50, together with hoop 30, allow for easy and quick assembly to a lure, even a lure with which the connector must be laced through two holes in a lure blade. Its design is inherently strong, allowing the use of relatively thinner structures and minimized dimensions with eyelets 60, 70, stems 40, 50, and/or hoop 30. The design, including its shape and its relatively thinner structures, allows unconstrained movement of the lure during retrieval through water, even blade baits and bladed swim jigs. The unitary nature of connector 20 is inconsistent with unintentional release. And the configuration of hoop 30, in cooperation with the configuration of eyelets 60, 70, hoop thickness 32, and, in certain embodiments stems 40, 50, allows a fishing lure to assume an aerodynamically efficient pose while traveling through air during casting, allowing longer and more accurate casting of the lure.

While preferred embodiments of the invention have been shown and described, modifications and variations may be made thereto without departing from the spirit and scope of the present invention. Thus, it should be understood that various embodiments may be interchanged, both in whole or in part. Furthermore, those with skill in this technology will appreciate that the foregoing description is by way of example only and is not intended to be a limitation of the invention as further described in the appended claims.

The invention claimed is:

1. A fishing lure line connector, comprising:
   an elongated member, the elongated member shaped to form first and second eyelets at its respective ends and a circinate hoop;
   a first stem extending from the circinate hoop to the first eyelet and a second stem parallel to the first stem and extending from the circinate hoop to the second eyelet; and
   the first and second eyelets axially aligned and residing outboard of the circinate hoop.

2. The fishing lure line connector of claim 1, wherein the first and second eyelets reside side-by-side.

3. The fishing lure line connector of claim 1, wherein the hoop defines a center and the first and second stems extend radially from the center.

4. A fishing lure line connector, comprising:
   a circular hoop;
   first and second stems projecting radially from the circular hoop and residing parallel to each other;
   the first and second stems respectively terminating at first and second line apertures, the first and second line apertures being coaxial; and
   the hoop, the first and second stems, and the first and second line apertures being unitary.

5. The fishing lure line connector of claim 4, wherein the stems reside side-by-side.

6. The fishing lure line connector of claim 4, wherein the circular hoop defines a uniform maximum thickness.

7. The fishing lure line connector of claim 4, wherein the circular hoop and the first and second stems define a uniform maximum thickness.

8. The fishing lure line connector of claim 4, wherein the connector defines a maximum thickness about the hoop and the hoop defines a minimum inner diameter, the minimum inner diameter at least triple the maximum thickness.

9. The fishing lure line connector of claim 7, wherein the line apertures respectively define first and second outer maximum widths, the outer widths being no greater than quintuple the maximum thickness.

10. The fishing lure line connector of claim 8, wherein the minimum inner diameter is at least six times the maximum thickness.

11. A method of attaching a fishing lure line connector to a fishing lure having a blade defining therethrough first and second connector holes, comprising:
    Providing a fishing lure line connector comprising a hoop with first and second axially aligned line apertures connected to and disposed outboard of the hoop and having first and second stems extending from the hoop positioned parallel to each other; and
    moving the first aperture through the first connector hole and moving the second aperture through the second connector hole.

12. The fishing lure line connector of claim 11, wherein the first and second line apertures each define an interior profile, each interior profile being curvilinear opposite the hoop.

13. The method of claim 11, wherein said first and second stems respectively are interposed between the hoop and the first and second line apertures.

14. The method of claim 13, wherein the first and second stems extend radially from the hoop.

15. The fishing lure line connector of claim 11, wherein the first and second connector holes respectively define a first and second minimum width and the connector defines a maximum thickness about the hoop, the first and second minimum widths being at least quadruple the maximum thickness.

16. The fishing lure line connector of claim 15, wherein the hoop defines a minimum diameter, the minimum diameter at least triple the maximum thickness.

* * * * *